(No Model.)
P. E. BERTHIER.
PEA VINE RAKE.
No. 484,394. Patented Oct. 18, 1892.
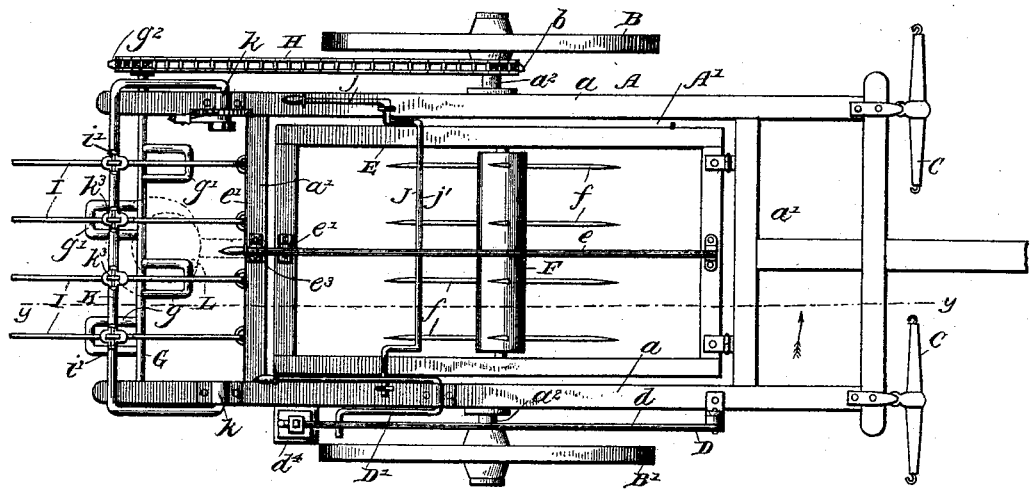
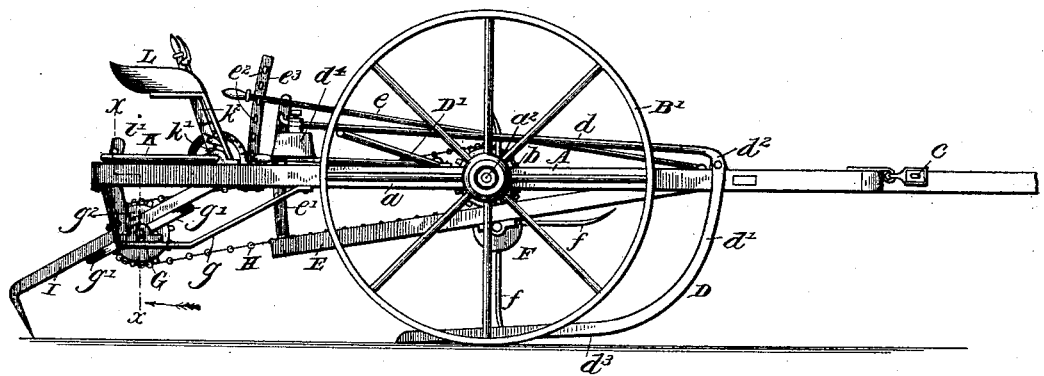
Witnesses
J. Edgar Smith
Edward L. Gies
Inventor
Peter E. Berthier
by Geo. W. Kern
Attorney (No Model.)
P. E. BERTHIER.
PEA VINE RAKE.
No. 484,394. Patented Oct. 18, 1892.
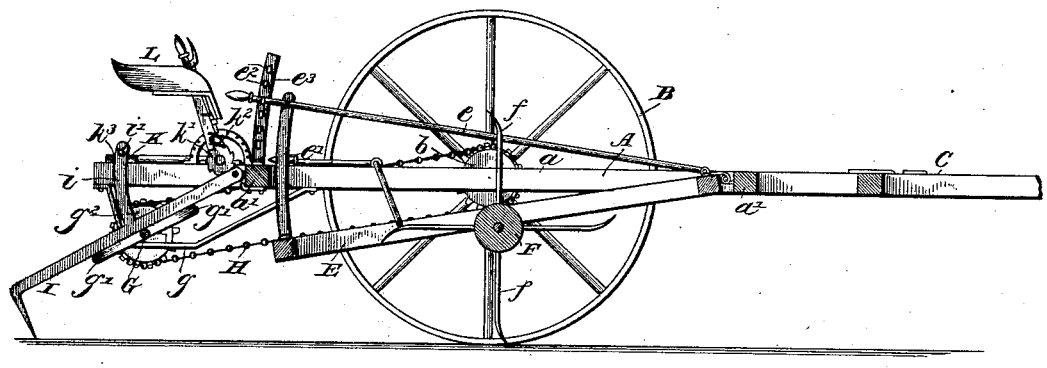
Witnesses
J. Edgar Smith
Edward L. Gies
Inventor,
Peter E. Berthier,
by Geo. W. Kern.
Attorney

UNITED STATES PATENT OFFICE.

PETER E. BERTHIER, OF LAKELAND, LOUISIANA.

PEA-VINE RAKE.

SPECIFICATION forming part of Letters Patent No. 484,394, dated October 18, 1892.

Application filed April 16, 1892. Serial No. 429,430. (No model.)

*To all whom it may concern:*

Be it known that I, PETER E. BERTHIER, a citizen of the United States, residing at Lakeland, in the parish of Pointe Coupee and State of Louisiana, have invented certain new and useful Improvements in Pea-Vine Rakes; and I do hereby declare the following to be a full, clear, and exact description of the invention, such as will enable others skilled in the art to which it appertains to make and use the same.

This invention is an improvement in harvesters, and relates particularly to that class of harvesters known as "pea-vine rakes."

The object of the invention is to produce a pea-vine rake which will cut, pull, and spread the vines at one and the same operation or which will cut and pull the vines at one time and spread them afterward.

The invention has for further objects to produce a pea-vine rake which will be simple in structure, durable in use, efficient in operation, and comparatively inexpensive of manufacture.

With these objects in view the invention resides in the various novel details of construction and in the combinations of parts hereinafter fully described, and particularly pointed out in the claims.

In the drawings in which I have illustrated my invention, and in which like letters of reference indicate corresponding parts in all the views, Figure 1 is a side elevation of my device. Fig. 2 is a plan view thereof. Fig. 3 is a view taken on line $y\ y$ of Fig. 2 and viewed in the direction of the arrow. Fig. 4 is a view taken on the line $x\ x$ of Fig. 1 and viewed in the direction of the arrow. Fig. 5 is a view in elevation of the lever and pawl- and-ratchet mechanism for raising the tedders from the ground. Fig. 6 is a detail view of one of the tedder-hooks.

In the drawings, the letter A designates the framework or carriage of the machine, the same consisting of the side bars $a$ and the cross-bars $a'$, which form the central quadrangular space $A'$. The side bars project at both ends beyond the cross-bars. Short axles $a^2$ are secured to the middle of the length of each of the side bars $a$, and on these axles wheels B and B' are mounted. Suitable draft devices C are provided for the frame.

This harvester has been described as a cutter, a raker, and a spreader, and it will be convenient to describe the various parts under these heads and in this order.

The cutter D, then, consists of a straight portion $d$, a curved portion $d'$, forming an angle $d^2$ therewith, and a knife $d^3$, having a cutting-edge on its forward and under side extending rearwardly, approximately parallel to the straight portion. This cutter D is pivoted to one of the side bars $a$ of the frame A at its angle $d^2$ in front of the wheels and is provided with a weight $d^4$, which is adjustable along the straight portion $d$ by means of a collar surrounding $d$, and a thumb-screw passing through the collar. The function of the weight is to keep the knife $d^3$ pressed against the vines, and by placing it at various points along the straight portion $d$ the strength of cut of the knife may be varied at pleasure. When it is desired to raise the knife from the ground entirely, a bent lever D', which is journaled on the side bar $a$ may be used. This lever D', having one of its ends under the straight portion $d$, will when it is turned up support the cutter D.

The raking device consists of a quadrangular frame E, hinged to the forward cross-bar $a'$ and adapted to swing up and down within the space $A'$ in framework A and a revolving rake F, journaled in the frame E. The rake F is provided with radial tines $f$, by preference arranged in rows a quadrant apart. To the forward end of the frame E one end of a lever $e$ is securely fastened, the other end of the lever being connected with the rear portion of the frame E by a curved bar $e'$ and being provided with a handle which is adapted to rest in any one of the hooks $e^2$ of the curved standard $e^3$, which is secured to the rear cross-bar $a'$. By means of the lever $e$ and the curved standard $e^3$ the frame E may be elevated, so that the tines $f$ will not touch the ground. Extending across the frame and journaled at either end in the side bars $a$ is a bent rod J, having one end bent at an angle and continued into a handle $j$ and having the bent portion $j'$ extending a sufficient distance below the plane of the frame A to bear against a row of tines on the revolving rake. When one row of tines becomes full of vines, the handle $j$ is lifted to bring the bent portion $j'$ out of engagement with the row of tines when the rake will be caused to revolve, thus releasing the vines from the rake and depositing them on the ground where they are spread by the tedder. The handle $j$ is then pressed down and the part $j'$ is brought in engagement with a row of tines and the rake locked against further revolution until a row of tines is again filled with vines when the preceding operation is repeated.

The spreading device or tedder mechanism is arranged in the rear of the machine. A shaft G is journaled in brackets $g$, which depend from the ends of the side bars $a$. This shaft has projecting from it rectangular arms $g'$, which are arranged alternately on either side, in order to raise and drop the tedder-hooks (to be described) alternately. One end of this shaft projects beyond the side bar on the same side of the frame A with the wheel B, and has fast upon it the sprocket-wheel $g^2$. The hub of the wheel B has secured upon it a sprocket-wheel $b$, and the two sprocket-wheels $b$ and $g^2$ are connected by a sprocket-chain H, which by their means transmits the motion of the wheel B to the shaft G. The tedder-hooks I are loosely hinged to the rear cross-bar and extend rearwardly therefrom over the arms $g'$ on the shaft G. It will thus be seen that as the shaft G revolves the arms $g'$ will alternately impinge against the under sides of the hooks I and cause them to be raised and lowered in order, thus operating to spread the cut vines. Each hook I has a curved arm $i$ extending upwardly from it. A bar K extends across the space above the hooks I and has its ends bent twice at right angles in the same plane and direction, so that they may be journaled, as shown at $k$, in the side bars $a$. One of these ends extends beyond its journal and has fast upon it the ratchet-wheel $k'$, which is engaged by the dog on the grip-lever $k^2$. The bar K is provided with transverse slots $k^3$ for the reception of the curved arms $i$ of the hooks I, and these arms are allowed free play therein, being limited only by pins $i'$, which are inserted in eyes in their upper ends and which rest at times upon the bar K. When the tedder is used, the bar K will be allowed to rest upon the side bars $a$ and the curved arms $i$ will work freely up and down through the slots $k^3$; but when the use of the tedder is not desired, the bar K is held up by the grip-lever $k^2$ and supports the hooks above the ground by the pins $i'$ resting upon it.

L designates the driver's seat.

The structure and operation of the machine will readily be understood from the foregoing description. The uses to which it may be put are many; but I expect to use it principally in harvesting pea-vines. I may cut, pull, and spread the vines at one trip of the machine, or I may cut and pull the vines on the first trip over a row and spread them when the machine returns. The first method of working, as above described, may be accomplished by having the revolving rake and the tedder-hooks both in operative position at one and the same time, and the second by first raising the tedder and lowering the rake and afterward reversing their relative positions. It is of course understood that when one row of rake-tines becomes full of vines the pull thereon will cause the rake to revolve, thus releasing the vines from the rake and depositing them upon the ground. The tedder spreads them.

Having thus fully described my invention, what I claim as new, and desire to secure by Letters Patent, is—

1. In a harvester of the class described, the combination, with the main frame of the machine, of a frame hinged within it supporting a revolving rake, a stop on the main frame for preventing the revolution of the rake, an upright standard secured to the main frame, having hooks projecting from one side, and a lever secured to the frame of the revolving rake and adapted to engage the hooks on said standard, whereby the rake may be raised and held at any desired distance from the ground, substantially as described.

2. In a harvester of the class described, the combination, with the main frame supporting a revolving rake, of a cutting-knife pivoted to said frame, having one end extending toward the rear of the machine to support an adjustable weight and having its other end curved from the point of attachment to the frame to extend downward and toward the rear of the machine and provided with a cutting-edge on its forward and under side, substantially as described.

3. In a harvester of the class described, the combination, with the carriage, of a tedder located at the rear of the same, comprising hooks hinged to the frame of the machine, curved bars extending upwardly from said hooks and extending through and supported in a suitable supporting device, and means for raising and lowering said hooks alternately, substantially as described.

4. In a harvester of the class described, the combination, with the carriage, of a tedder located at the rear of the same, comprising hooks loosely hinged to the carriage, a curved arm extending upwardly from each of the hooks, a supporting device for each of said hooks journaled in the frame of the machine having slots through which the curved arms pass and in which they are held against removal, a shaft having arms extending from either side thereof, journaled in suitable brackets below the hooks and adapted when revolved to raise and drop the hooks alternately, and suitable driving-gear connecting said shaft with the axle of the machine for imparting motion to the shaft, substantially as described.

5. In a combined cutting, raking, and spreading machine, the combination, with the carriage, of a weighted knife pivoted thereto, a frame hinged to the carriage, supporting a revolving rake, said frame adapted to be adjusted to desired distances from the ground, a tedder operating as described, located at the rear of the carriage and adjustable to desired distances from the ground, the parts operating substantially as and for the purposes set forth.

In testimony whereof I affix my signature in presence of two witnesses.

PETER E. BERTHIER.

Witnesses:
OMER SAMSON,
ALEXIS GREMILLON.